July 31, 1951  C. FISCHBACH  2,562,452
MACHINE FOR EXTRACTING JUICE FROM FRUITS
Filed Sept. 21, 1948  3 Sheets-Sheet 1

INVENTOR,
Carlos Fischbach
BY Juan P. Tashof,
ATTORNEY

July 31, 1951  C. FISCHBACH  2,562,452
MACHINE FOR EXTRACTING JUICE FROM FRUITS
Filed Sept. 21, 1948  3 Sheets-Sheet 3

INVENTOR,
Carlo Fischbach
BY Ivan P. Tashof,
ATTORNEY

Patented July 31, 1951

2,562,452

UNITED STATES PATENT OFFICE 2,562,452

MACHINE FOR EXTRACTING JUICE FROM FRUITS

Carlos Fischbach, Buenos Aires, Argentina

Application September 21, 1948, Serial No. 50,274
In Argentina March 24, 1948

8 Claims. (Cl. 146—3)

This invention relates to improvements in machines for extracting juice from fruits such as oranges or other citrus fruits, said improvements residing in the simplification of the mechanisms and elements of such machines.

One of the main features of the improvements subject of the present invention resides in the fact that the cut fruit receiver is arranged along a horizontal axis, with the receiving cavities located radially to said axis.

A further object of the invention is to provide a machine of the above-mentioned type, wherein the cut fruit receiver is integral with the fruit conveyor.

A further object of the invention is to provide a machine of said type, wherein the cutting blade is interposed between the pairs of receiving cavities, so that the axis thereof will be parallel to that of the cut fruit receiver.

A still further object of the invention is to considerably reduce the driving system of the machine, thereby facilitating the cleaning thereof.

A still further object of the invention is to provide a multiple machine formed by a plurality of receiver groups and cutting blades which are capable of operating simultaneously on a pair of parallel shafts, actuated by a single driving member.

A still further object of the invention is to minimize the power necessary for operating the machine.

A still further object is to provide a machine having means for separating the juice and pulp of the fruit.

A still further object is to provide a machine of the above-mentioned type, wherein the means for separating the fruit juice and pulp, constituted by a strainer, is actuated simultaneously and in synchronism with other movable elements and mechanisms of the apparatus.

The invention also contemplates other objects and advantages which will become apparent from the following description. In order that the invention may be more clearly understood and readily carried into practice, same has been illustrated by way of example and in a preferred embodiment in the accompanying drawings, in which.

The same reference characters are used to designate like or corresponding parts or elements throughout the drawings.

Figure 4:
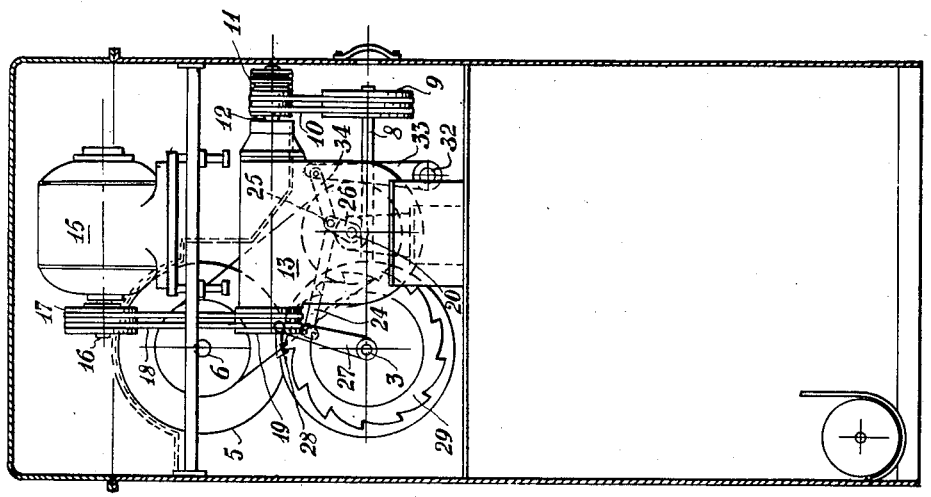
Fig. 4 shows the driving element and actuating means of the system.

As shown in the drawings, the machine of this invention comprises the following parts and mechanisms:

(a) A means for receiving the cut fruit, forming a part of a conveyor therefor.

(b) A blade or knife for cutting said fruit during the conveying operation.

(c) A squeezer for extracting juice from the cut fruit.

(d) A link-crank mechanism for the simultaneous actuation of the receiver-conveyor means and the juice extractor.

(e) A strainer for separating the juice from the pulp.

(f) A means for reciprocating the strainer, synchronized with the mechanism indicated at (d).

(g) A driving member for the continuous actuation of the cutting blades and of the mechanism indicated under (d) and (f).

The receiving means is constituted by a pair of cylinders 1 and 1' having on the cylindrical surfaces thereof a plurality of semi-spherical cavities 2, each adapted to receive one of the pieces resulting from the operation of cutting the fruit.

Said receivers are arranged in pairs mounted on a single horizontal shaft 3, so that each of the cavities corresponding to a receiver will be permanently positioned adjacent the cavity of the other receiver, with the fruit conveying means forming a part of said receiver interposed therebetween.

Said conveyor is formed by two flat members placed back to back intermediate the cylinders 1 and 1' and having aligned projections 4 and 4', respectively, on their circumferences, said projections extending radially with respect to said receiving cylinders and being divergent axially so that the cutting edge of a circular knife 5 may pass between each pair of said members. Said circular knife 5 is mounted on a shaft 6 parallel to said similar shaft 3 but supported above the latter.

The means for extracting juice from the fruit is formed by an element 7 of parabolic or semi-spherical section, so that it can enter said cavities 2 through the action of a suitable mechanical means operating on a shaft 8 having secured to the end thereof said element 7. The surface of said element 7 is provided with a plurality of helical grooves or is otherwise roughened so as to facilitate the juice extracting operation.

The squeezer thus constituted is linearly displaceable axially to shaft 8 and rotatable about the axis of said shaft 8.

In the case of the multiple machine illustrated, said rotary motion is obtained by securing to one of said shafts 8 a pulley 9 associated by means of a belt 10 to a pulley 11 secured to the driving shaft 12 of a speed reducer 13, the motion being transmitted to the remaining squeezers through a gear train designated by the reference numeral 14.

The assembly of mechanisms and movable elements is actuated by a motor group 15 the shaft 16 of which has secured thereto a pulley 17 connected through a belt 18 to a similar pulley 19 mounted on shaft 12 of reducer 13.

Figure 3:
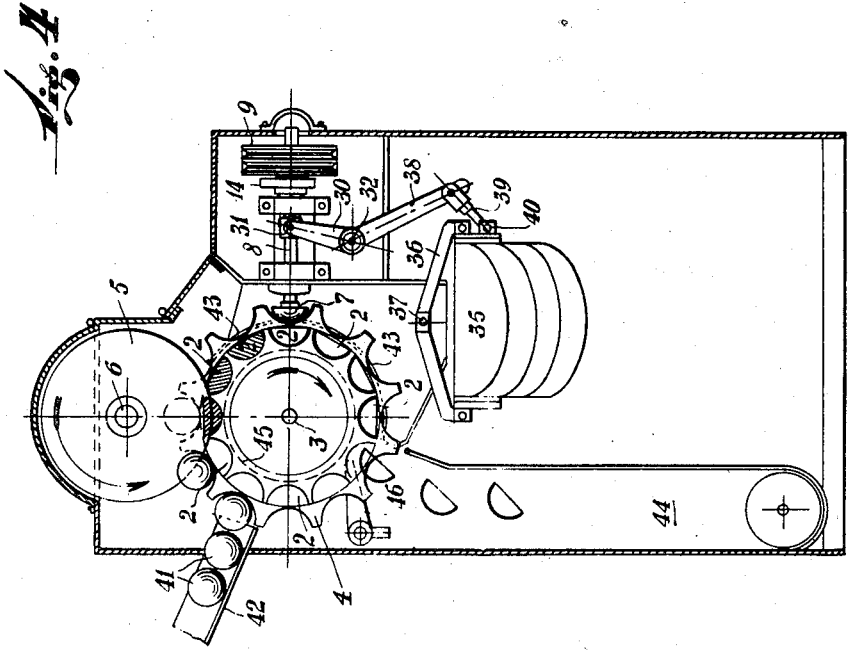
Fig. 3 shows a detail of the main elements corresponding to each functional unit.

Mounted on a shaft 20 of said speed reducer is a pulley 21 which by means of a belt 22 and pulley 23 causes the rotation of shaft 6 carrying said knives 5, thereby causing the rotation of the latter knives in the direction indicated in Fig. 3.

The actuation of receivers 1, 1' and conveyors 4, 4' is effected through a link 24 connected by one end through a rotary connection 25 to a member 26 suitably secured to shaft 20, while the other end of said link is connected to a lever arm 27 pivoted to shaft 3 and provided with a trigger 28 meshing alternatively and periodically with a crown or toothed disc 29 secured to one end of said shaft 3.

The continuous rotation of shaft 20 will transmit an alternative and periodic angular movement to said lever arm 27, causing said trigger 28 to engage said toothed wheel 29, thereby causing the rotation of the latter together with shaft 3 and the parts connected thereto, viz: said receivers 1—1' and conveyors 4—4'.

The linear displacement of shaft 8 forming a part thereof is obtained by means of a lever arm 30 having one of the ends thereof connected to a bushing 31 associated with said shaft, while the opposite end thereof is associated with a shaft 32 actuated by means of a lever 33 operatively connected through a link 34 to said connection 25.

The reference numeral 35 indicates a strainer of any suitable type, supported by means of a support 36 capable of oscillating on a shaft 37, said oscillation being obtained through the action of links 38 and 39, of which the former is connected with said shaft 32, while the latter is connected to a point 40 of the supporting member.

It will be seen from the above that the rotation of shaft 26, by means of link 34 and lever arm 33, will cause the oscillation of shaft 32 and the latter will in turn transmit said movement to shaft 8 and the members connected thereto, through the action of lever 30.

A piece of fruit indicated at 41 is fed through an inclined chute 42 one of the ends of which faces the corresponding conveyor 4, 4' carrying said fruit toward the knife which will cut same as shown in Fig. 3.

Once the fruit has been cut, the two resulting fruit pieces will fall by gravity into the adjacent cavities of the receiver means which for a portion of its travel will displace underneath a shield 43 serving to prevent the fruit from leaving the respective cavity 2 until it reaches the space corresponding to a discharge deposit 44.

Figure 2:
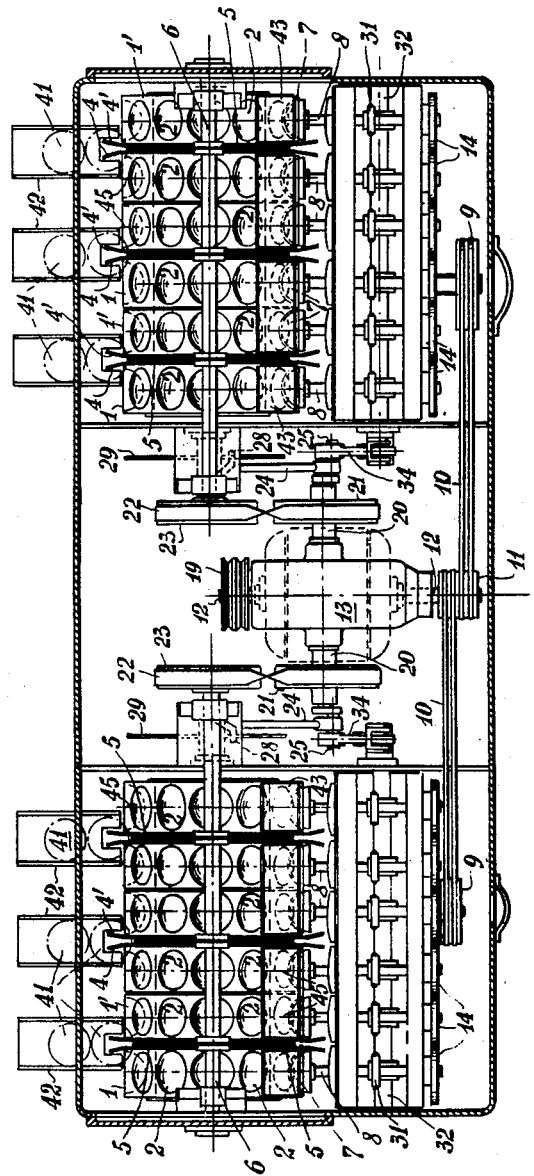
Fig. 2 is a plan view of the same machine.
Figure 1:
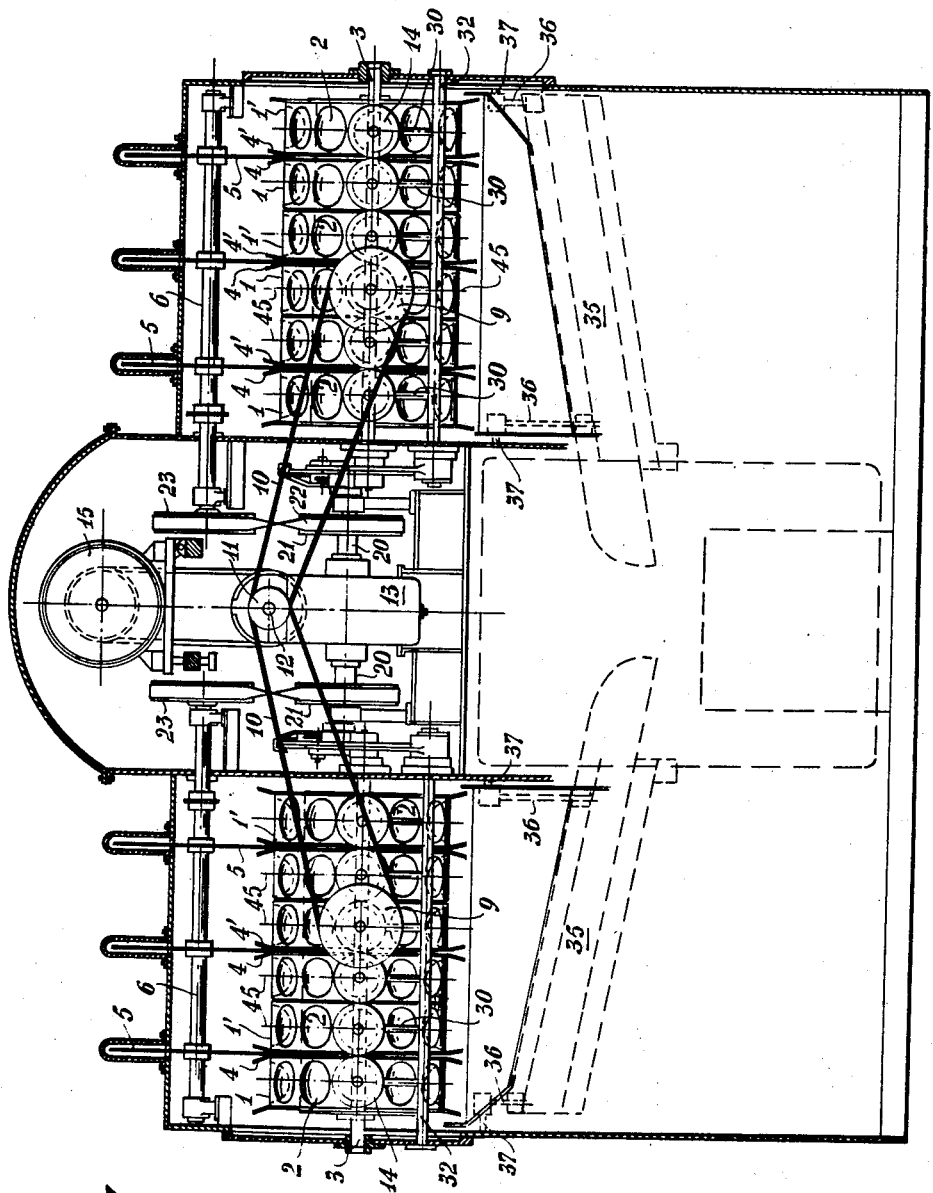
Fig. 1 is a front elevational view of the machine.

Each receiver 1, 1' may be provided with a circumferential groove indicated at 45 in Fig. 3 and by an imaginary line in Figs. 1 and 2, said groove serving the purpose of housing one of the ends of an arm 46. The function of said arm 46 is to withdraw any fruit skin not falling by gravity from said cavities.

It is evident that in carrying out the invention, several modifications and changes in the structural details and shape of the different parts will occur to those skilled in the art, without departing from the scope of the invention as clearly set forth in the appended claims.

I claim:

1. In a fruit juice expressor, a pair of axially aligned rotatable cylinders, each cylinder having therein a circumferential row of fruit-receiving cavities, a fruit conveyor comprising a pair of flat members interposed between said cylinders, said flat members having arcuately spaced projections intermediate the cavities in the cylinders, said projections being relatively axially divergent, a rotary cutting knife positioned so that the aligned projections on the flat members successively receive the knife therebetween, aligned reciprocable expressor plungers cooperating respectively with the circumferential rows of cavities in the cylinders and adapted to extend successively into said cavities, a strainer pivotally mounted below the location of impact of said expressor plungers with said cylinders, and means for rotating said cylinders and knife, for reciprocating said expressor plungers, and for oscillating said strainer in timed relationship with the rotation of said cylinders.

2. In a fruit juice expressor, a pair of axially aligned rotatable cylinders, each cylinder having therein a circumferential row of fruit-receiving cavities, a fruit conveyor comprising a pair of disc members interposed between said cylinders, said disc members having arcuately spaced projections intermediate the cavities in the cylinders forming recesses in alignment with the said cavities for receiving the fruit before severing and said projections being relatively axially divergent for supporting the fruit in said recesses, a rotary cutting knife positioned so that the aligned projections on the disc members successively receive the knife therebetween for severing the fruit carried in the recesses in the disc members to allow the respective halves to drop into the fruit receiving cavities in the cylinders, aligned reciprocable expressor plungers cooperating respectively with the circumferential rows of cavities in the cylinders and adapted to extend successively into said cavities to squeeze the halves of fruit therein, gearing interconnecting said expressor plungers for conjoint rotation, and means for rotating said cylinders, knife, and expressor plungers, and for reciprocating said expressor plungers in timed relationship with the rotation of said cylinders.

3. In a fruit expressor, a pair of adjacent axially aligned cylinders having fruit-receiving cavities therein, a rotary knife positioned intermediate said cylinders, a pair of aligned reciprocable expressor plungers adapted to cooperate respectively with said cylinders and to enter the cavities therein, a strainer pivotally mounted below the location of impact of said expressor plungers with said cylinders, a power shaft, a step-by-step mechanism intermediate said power shaft and said cylinders for intermittently rotating the latter, a linkage intermediate said power shaft and said expressor plungers for reciprocating the latter in timed relationship with the intermittent rotation of said cylinders, and for oscillating said strainer.

4. In a fruit expressor, a pair of adjacent axially aligned cylinders having fruit-receiving cavities therein, a rotary knife positioned intermediate said cylinders, a pair of aligned expressor plungers adapted to cooperate respectively with said cylinders and to enter the cavities therein, a strainer pivotally mounted below the location of impact of said expressor plungers with said cylinders, a motor, a drive intermediate said motor and expressor plungers for rotating the latter, a power shaft, a drive intermediate said motor and power shaft, a step-by-step mechanism intermediate said power shaft and said cylinders for intermittently rotating the latter and for oscillating said strainer, and a linkage intermediate said power shaft and said expressor plungers for reciprocating the latter in timed relationship with the intermittent rotation of said cylinders.

5. In a fruit expressor, a pair of adjacent axially aligned cylinders having fruit-receiving cavities therein, a rotary knife positioned intermediate said cylinders, a pair of aligned reciprocable expressor plungers adapted to cooperate respectively with said cylinders and to enter the cavities therein, a strainer pivotally mounted below the location of impact of said expressor plungers with said cylinders, a power shaft, a step-by-step mechanism intermediate said power shaft, and said cylinders, for intermittently rotating the latter, a linkage including a rock shaft intermediate said power shaft and said expressor plungers for reciprocating the latter in timed relationship with the intermittent rotation of said cylinders, and a linkage intermediate said rock shaft and strainer for oscillating the latter.

6. In a fruit juice expressor, a pair of aligned and closely spaced fruit carrying cylinders, a fruit conveyor comprised by a circular member positioned intermediate said cylinders, said circular member having pairs of circumferentially spaced projections axially divergent to form a four point support for each piece of fruit prior to being cut in two halves, a rotary knife travelling in the space intermediate said pairs of projections for cutting the fruit, each cylinder having therein a circumferential row of fruit-receiving cavities each arcuately positioned intermediate two pairs of projections on the circular fruit conveyor member, aligned reciprocable expressor plungers cooperating respectively with the circumferential rows of cavities in the cylinders and adapted to extend successively into said cavities, and means for rotating said cylinders and knife and for reciprocating said expressor plungers in timed relationship with the rotation of said cylinders.

7. In a fruit juice expressor, a rotatable shaft, a pair of aligned closely positioned cylinders on said shaft, each cylinder having therein a circumferential row of fruit-receiving cavities, a fruit conveyor comprised by a pair of flat members interposed between said cylinders, said flat members having arcuately spaced projections intermediate the cavities in the cylinders, said projections being relatively axially divergent, a rotary cutting knife positioned so that the aligned projections on the flat members successively receive said knife therebetween, aligned reciprocable expressor plungers cooperating respectively with the circumferential rows of cavities and adapted to extend successively into said cavities, a ratchet gear on said shaft, an arm freely mounted on said shaft and carrying a pawl selectively engageable with said ratchet gear, a drive shaft, a crank arm on said drive shaft, a link connecting said crank arm to said freely mounted arm, a rock shaft, an arm on said rock shaft connected to said expressor plungers for reciprocating same, a second arm on said rock shaft, and a link connecting said second arm to the crank arm on the drive shaft, a speed reducer connected to said drive shaft, a rotary drive from said speed reducer to said expressor plungers for rotating same, and a motor operatively connected to said speed reducer.

8. In a fruit juice expressor, a pair of axially aligned rotatable cylinders, each cylinder having therein a circumferential row of fruit-receiving cavities with a circumferential groove running through the bottoms of each row of cavities, a fruit conveyor comprised by a pair of disc members interposed between said cylinders, said disc members having arcuately spaced projections intermediate the cavities in the cylinders forming recesses in alignment with said cavities for receiving the fruit before severing and said projections being relatively axially divergent for supporting the fruit in said recesses, a chute terminating adjacent said cylinders for positioning fruit on said conveyor, a rotary cutting knife arcuately spaced from the said chute and positioned so that the aligned projections on the disc members successively receive the knife therebetween for severing the fruit carried in the recesses in the disc members to allow the respective halves to drop into the fruit receiving cavities in the cylinders, aligned reciprocable expressor plungers arcuately spaced from said rotary cutting knife and cooperating respectively with the circumferential rows of cavities in the cylinders and adapted to extend successively into said cavities to squeeze the halves of fruit therein, means for rotating said cylinders and knife and for reciprocating said expressor plungers in timed relationship with the rotation of said cylinders, an arcuate shield overlying said cylinders between the rotary cutting knife and the reciprocable expressor plungers and serving to hold the halves of the severed fruit in the cavities of the cylinders, and pivoted arms arcuately spaced from the reciprocable expressor plungers and extending into the circumferential grooves in the cylinders for removing the pulp and rinds of the fruit from the cavities therein.

CARLOS FISCHBACH.

REFERENCES CITED

The following references are of record in the file of this patent:

UNITED STATES PATENTS

| Number | Name | Date |
|---|---|---|
| 1,764,158 | Edwards | June 17, 1930 |
| 1,888,528 | Faulds | Nov. 22, 1932 |
| 2,078,737 | Segovia | Apr. 27, 1937 |
| 2,160,388 | Morse | May 30, 1939 |
| 2,332,177 | Smith | Oct. 19, 1943 |
| 2,368,800 | Bingenheimer | Feb. 6, 1945 |